J. R. TANNER & D. B. BANKS.
PIPE JOINT.
APPLICATION FILED JAN. 28, 1910.

969,423.

Patented Sept. 6, 1910.

WITNESSES

INVENTORS

UNITED STATES PATENT OFFICE.

JULIUS R. TANNER, OF PITTSBURG, PENNSYLVANIA, AND DANIEL B. BANKS, OF BALTIMORE, MARYLAND.

PIPE-JOINT.

969,423.     Specification of Letters Patent.     Patented Sept. 6, 1910.

Application filed January 28, 1910. Serial No. 540,688.

*To all whom it may concern:*

Be it known that we, JULIUS R. TANNER and DANIEL B. BANKS, citizens of the United States, residing at Pittsburg, in the county of Allegheny and State of Pennsylvania, and Baltimore, in the State of Maryland, respectively, have invented or discovered new and useful Improvements in Pipe-Joints, of which the following is a specification.

Figure 1:
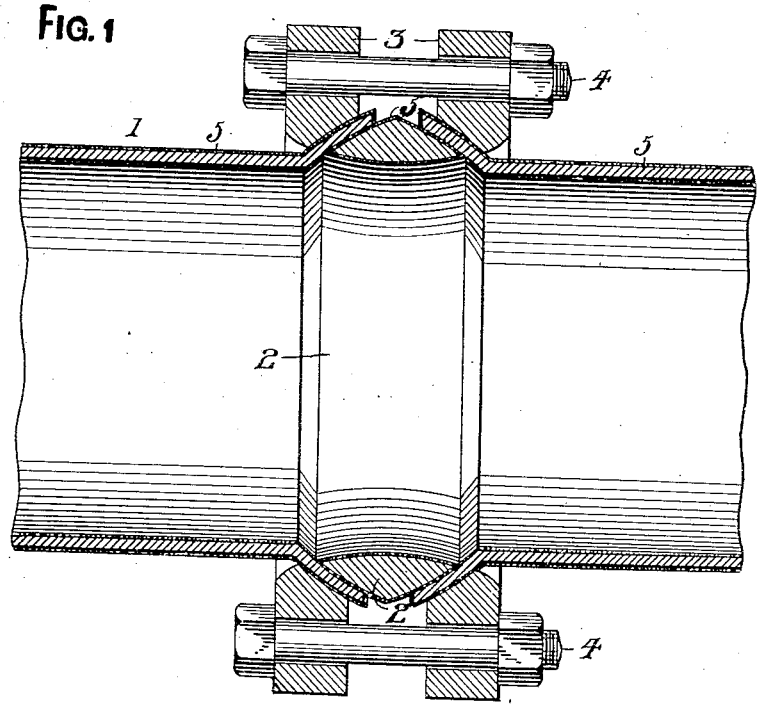

Our invention relates to pipe joints, and has reference more particularly to that class of flexible joints having a mandrel or ring within the flared ends of two pipes, the said ends being clamped against the periphery of the ring by means of two rings drawn together by bolts or otherwise, as shown on Figure 1 of the accompanying drawings. However, we do not limit our device to joints of any particular type.

It frequently happens where powerful electric currents are used, as in railway, traction and electric lighting services, the currents travel on the water and gas pipes, causing them to be corroded at the places where the electricity leaves the pipes. It is supposed that the electricity, as it leaves the pipes in the presence of water, causes its decomposition, whereupon the free oxygen attacks the iron of the pipes and forms iron-rust which eventually renders the attacked pipes worthless and even dangerous in certain instances. In many cases such pipes and mandrels as have been described hereinabove are coated with some rust-protective insulating coating, as asphalt, forming too high a resistance for the passage of electric currents between the connected pipe-ends.

It is the object of the present invention to make such coated or insulated joints good electric conductors. We do this preferably by providing at least one of the elements with projections which cut through the insulating coating, as shown in the accompanying drawings, in which—

Figure 2:
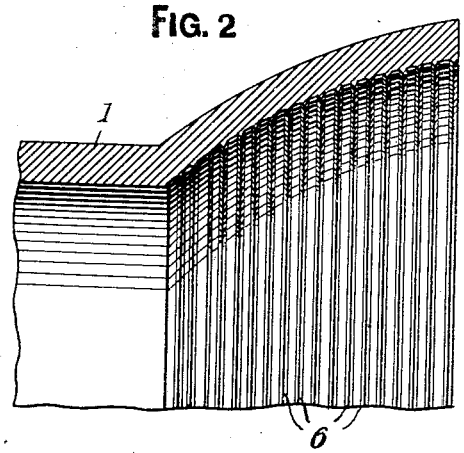
Figure 3:
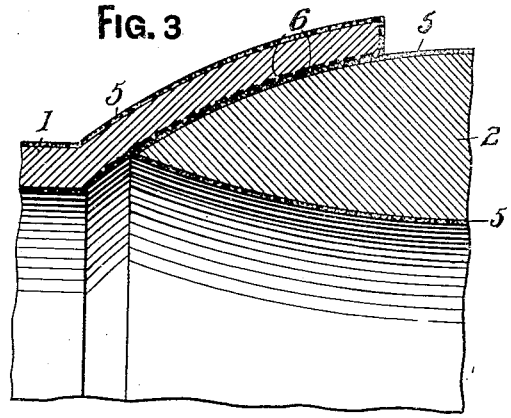

Fig. 1 is a longitudinal section of a pipe-joint constructed in accordance with our invention; Fig. 2, an enlarged view of a portion of Fig. 1; and Fig. 3, an enlarged section of a portion of a pipe-end, showing the insulation-cutting ribs or teeth.

On the drawings, 1 represents two pipes having their adjacent ends flared and fitting on the periphery of the ring or mandrel 2. It is essential, therefore, that the joints between the pipe-ends and the mandrel be fluid-tight. To cause the pipe-ends to fit the mandrel very tightly, we provide the clamping rings 3 having their interior surfaces of such shape and size as to engage the outer surfaces of the pipe-ends. Bolts 4 are passed through the rings and in an obvious manner serve to draw the rings toward each other, causing them to wedge and clamp the flaring pipe-ends tightly between the mandrel and the rings.

Currents of electricity may enter and leave such insulated pipes as we have described at places where the insulating coat has been removed or is very thin, with the result that the pipes become corroded at the places where the current leaves, as has been explained.

We regard it desirable that stray electric currents be made to pass through the metal of the pipe joints in order to reduce the number of possible places where the current will leave the pipe. While the required result may be secured in various ways, we prefer to provide the inner surfaces of the flared pipe-ends with the annular knife-like ribs or teeth 6, which, under the clamping action of the rings 3, cause the said ribs or teeth to cut through the coats 5 and engage the body metal of the mandrel 3 which is a good conductor of electricity. In doing this the teeth will not only cut through the coat on the mandrel, but will also cut through the coat of insulation which covers the teeth and comes into direct contact with the body of the mandrel. In case the mandrel is not coated as described, the teeth will, as when used with the coated mandrel, cut their way through the coat which covers them and directly engage the body of the mandrel. Preferably some of the coating between the teeth will be removed, except close to the place where the flaring of the pipes begins.

We claim—

1. In a pipe-joint, means connecting adjacent pipe-ends, an insulating coat between the said connecting means and the pipe-ends, and means on one of the parts of the joint adapted to pass through the said coat and thereby electrically connect the pipe-ends.

2. In a pipe-joint, two pipes having flaring ends, an annular mandrel seated in the flaring ends of the pipe-ends, an insulating coat between the mandrel and the pipe ends, and means for cutting through said coat, whereby the pipe-ends and the mandrel may be electrically connected.

3. In a pipe joint, two pipes having flaring ends provided with cutting projections coated with insulation, an annular mandrel within the flared pipe-ends, and means for causing the projections to cut through the said coat and electrically connect the pipe ends with the mandrel.

Signed at Pittsburg, Pa., this 15th day of January, 1910.

JULIUS R. TANNER.
DANIEL B. BANKS.

Witnesses:
F. N. BARBER,
SUZANNE S. BEATTY.